United States Patent [19]

Lowe et al.

[11] 4,005,565
[45] Feb. 1, 1977

[54] STACK WAGON

[75] Inventors: Terry Lee Lowe, Ankeny; Glenn Dale Head, Des Moines, both of Iowa

[73] Assignee: Deere & Company, Moline, Ill.

[22] Filed: Aug. 15, 1975

[21] Appl. No.: 605,142

Related U.S. Application Data

[63] Continuation of Ser. No. 473,746, May 28, 1974, abandoned.

[52] U.S. Cl. .................................................. 56/344
[51] Int. Cl.² ......................................... A01D 87/00
[58] Field of Search .......................... 56/341–343, 56/344–350, 13.4; 214/520–522; 302/17, 34, 59, 60; 100/66, 99, 215

[56] References Cited
UNITED STATES PATENTS

| | | | |
|---|---|---|---|
| 2,836,022 | 5/1958 | Caldwell | 56/13.3 |
| 2,916,330 | 12/1959 | Dumanowski | 302/34 |
| 3,556,327 | 1/1971 | Garrison | 214/522 |
| 3,732,672 | 5/1973 | Adee | 56/344 |
| 3,748,840 | 7/1973 | Kanengieter et al. | 56/341 |
| 3,793,156 | 2/1974 | Kanengieter et al. | 302/60 |
| 3,845,608 | 11/1974 | Lueshen | 56/13.3 |

*Primary Examiner*—Russell R. Kinsey

[57] ABSTRACT

A crop deflection mechanism, interconnected to and actuated by the movement of a stack-forming implement compressor roof, the mechanism including a rockable deflector mounted in the delivery tube means, a spring-biasing and stop means for controlling the arc through which the deflector rotates, a cable linkage means interconnecting the deflector to the compressor roof lift mechanism, to cause the deflector to rotate in direct response to the initial cycle movement of the compressor roof.

11 Claims, 4 Drawing Figures

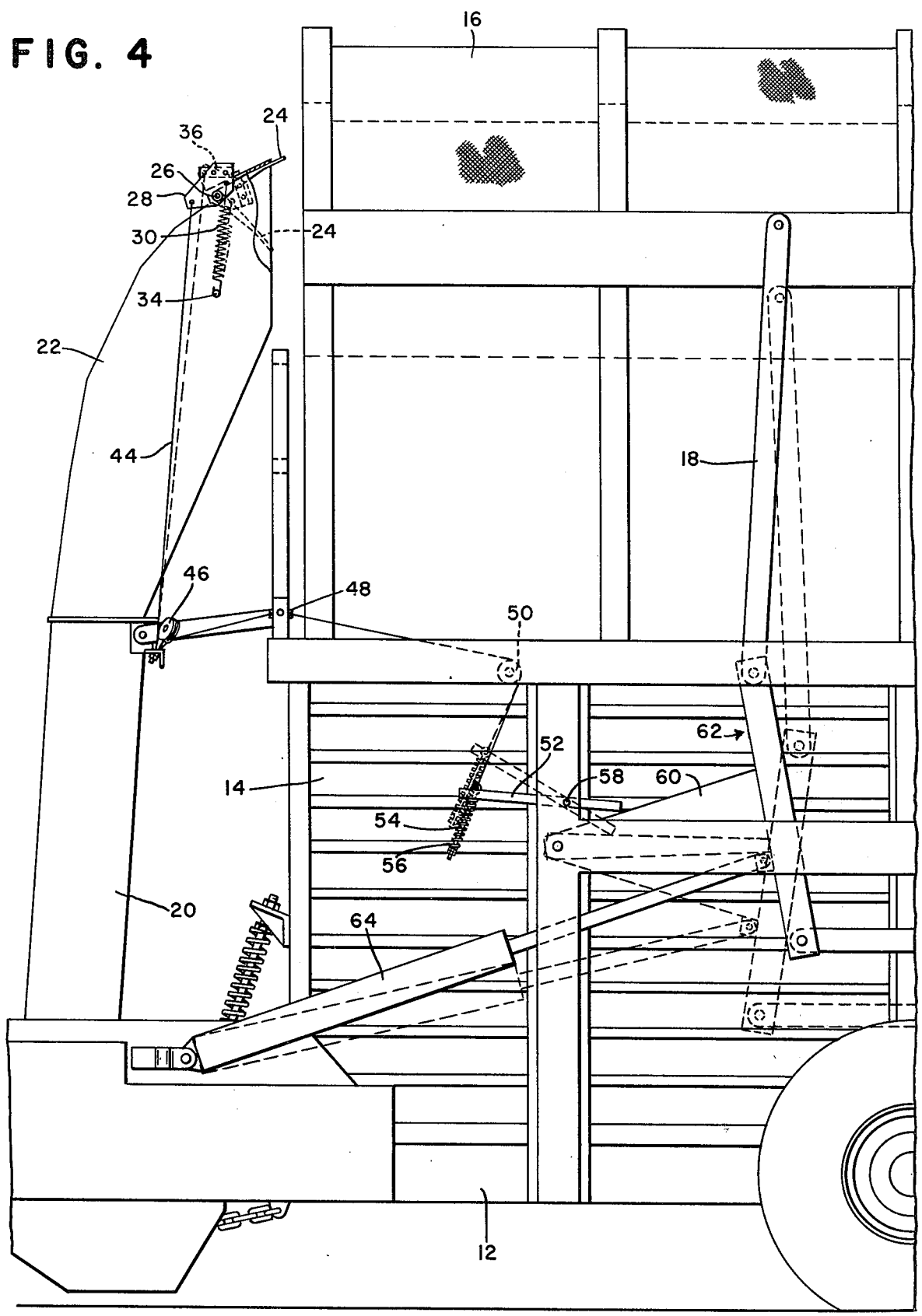

STACK WAGON

CROSS REFERENCE TO RELATED APPLICATION

This is a continuation of U.S. application Ser. No. 473,746 filed May 28, 1974 and now abandoned.

BACKGROUND OF THE INVENTION

The present invention relates generally to a mobile stack-forming implement of the type having a roof that is raised and lowered relative to a crop-receiving body for compacting crop material contained in the body from time to time to form a compressed stack, and more particularly to a control means for deflecting or directing a stream of crop material from a crop delivery means into the crop-receiving body.

Stack-forming implements of the type having a mobile frame, a crop-receiving body mounted on the frame, and means supported on the frame for picking crop material up off the field and delivering it to the body are known in the art. It is also known to employ a deflector to guide crops discharging from an elevator or chute into a wagon or place of storage. Various mechanisms have been used in the past for controlling the position of the deflector. These mechanisms have employed means directly controlled by the operator as well as indirect means whereby the deflector is activated by movement of other parts of the implement.

SUMMARY OF THE INVENTION

It is an object of this invention to provide an improved means for controlling the position of the deflector that is simple, and reliable in operation and economical to manufacture.

Another object of the invention is to provide a deflector control means which will enable the operator to control the deflector position from his position on the tractor.

It is further an object to take advantage of the compressor roof cycle action that periodically compacts the crop by interconnecting the compressor mechanism with the deflector to cause movement of the deflector in direct response to movement of the compressor roof during at least the initial portion of the compressor roof cycle. In pursuance of these and other objects, the invention comprises a crop-engaging deflector, pivotally mounted on the crop delivery means, for deflecting the crop stream to locations between the front and rear of the crop-receiving body, a cable interconnecting the deflector to a pivot rod pivotally mounted on the crop-receiving body, said pivot rod being rotated by the forwardmost compressor roof bell crank or lift means, for rotatably positioning the deflector so as to control the crop stream inclination, in direct response to the vertical reciprocal roof compression movement.

BRIEF DESCRIPTION OF THE DRAWINGS

In the drawings:

FIG. 4 is a view similar to FIG. 1, but illustrating the deflector in its lowered operating position.

DESCRIPTION OF THE PREFERRED EMBODIMENT

Figure 1:
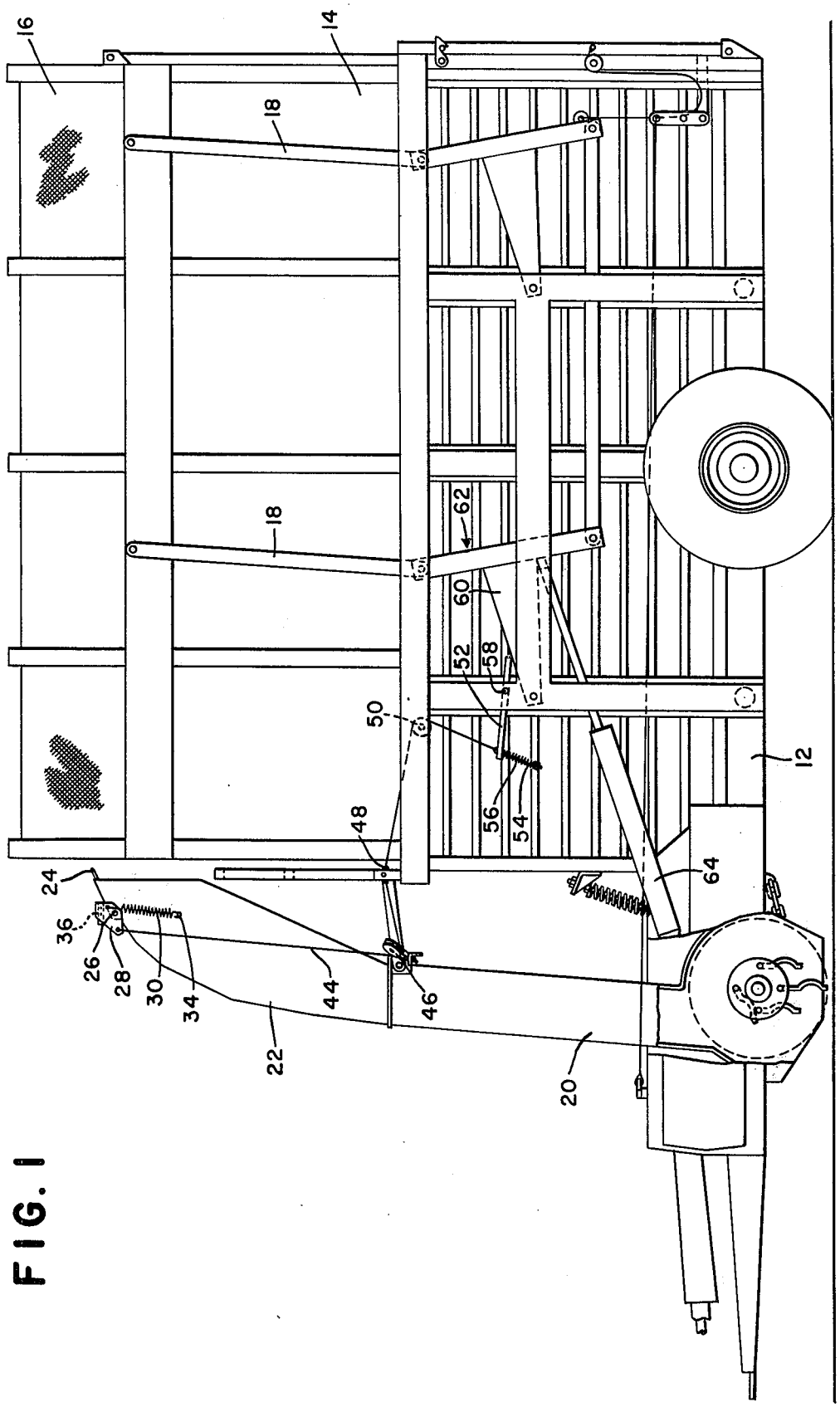
FIG. 1 is a side perspective view of the present invention embodied on a stack-forming implement.
Figure 3:
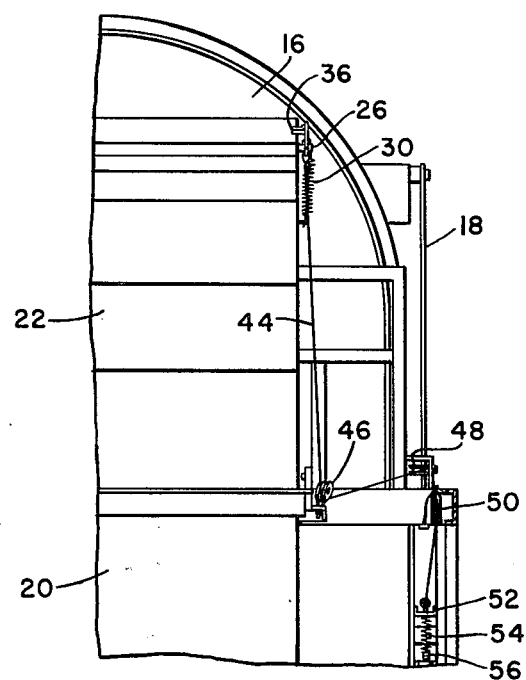
FIG. 3 is a front elevational view of the deflector mechanism illustrating the linkage.
Figure 2:
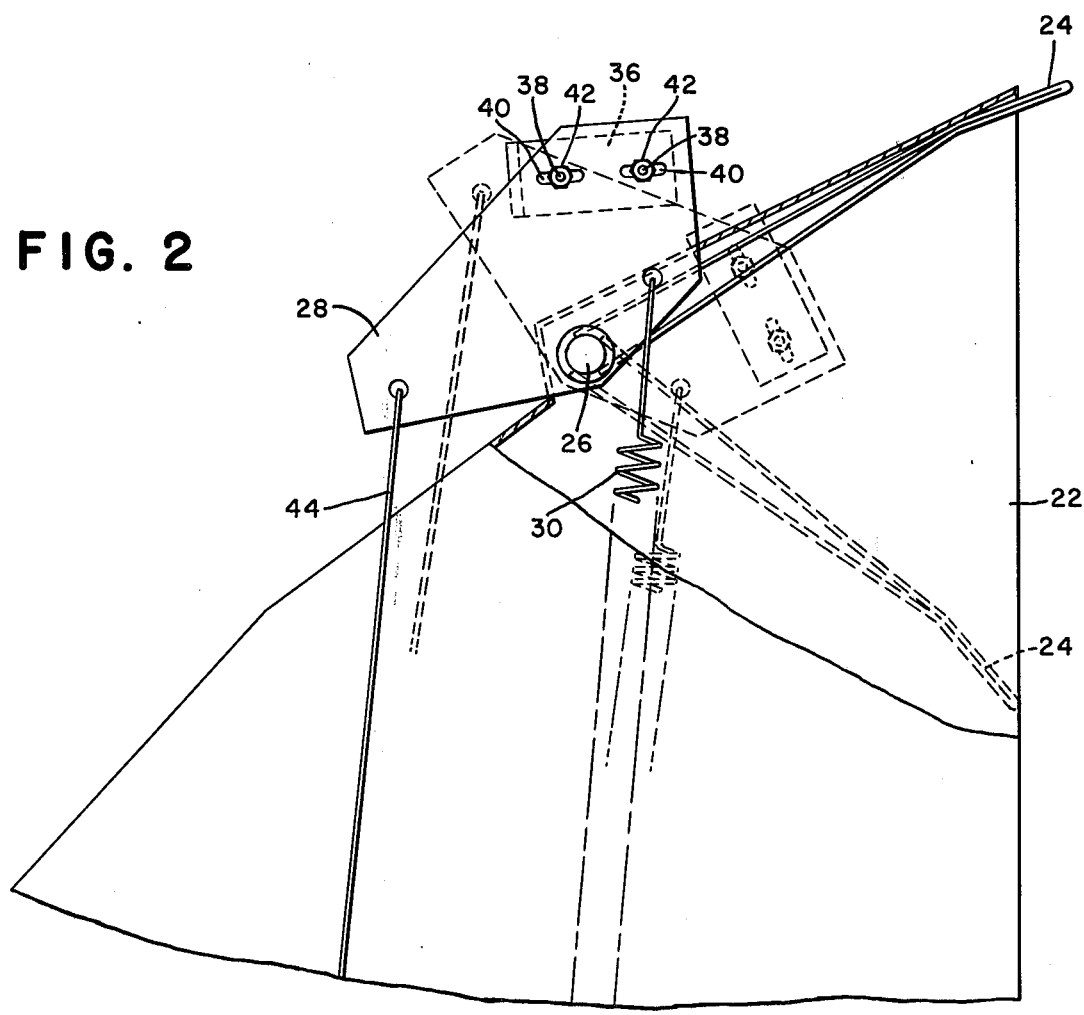
FIG. 2 is an enlarged side elevational view of the deflector mechanism illustrating the deflector in the deflect and nondeflect positions.

The invention is embodied in a stack-forming implement having a mobile frame 12 adapted to be towed by a tractor, a crop-receiving body 14 carried by the frame 12, a compressor roof 16, upper links 18 of a compressor roof lift means mounted on the body 14 for imparting vertical reciprocal movement to the compressor roof 16 and compressing material in the body; a crop pickup and delivery means 20 mounted on the frame 12 forwardly of the body 14 for picking material such as windrowed hay or corn stubble up off the ground and propelling the same upwardly through a material delivery tube and spout 22 for directing the material from the pickup unit rearwardly into the body 14 and a crop-engaging deflector 24 pivotally mounted on the crop delivery means 20 for alternatively deflecting the crop stream toward the rear or front portions of the crop-receiving body 14.

The deflector 24 is attached to a transverse pivot shaft 26 located in the upper and rear portion of the delivery tube means 20. Secured to the outer portion of the pivot shaft is a deflector arm 28. A biasing means or helical spring 30 is attached between the arm 28 rearwardly of the rotational axis of the shaft 26 and to a hole 34 in the delivery tube wall. When under tension, the spring exerts a clockwise force on the arm 28 tending to rotate the deflector 24 clockwise to the down or deflect position. When the deflector is lowered, i.e. occupies the deflect position, the stream of the crop material propelled through the delivery tube spout is deflected downwardly to the front portion of the body 14.

An L-shaped stop 36 is attached to the deflector arm 28. Two bolts 38 pass through slots 40 in the stop and holes in the arm 28 and are secured by nuts 42. The base of the L-shaped stop 36 will abut against the delivery tube wall and thereby limit the deflector rotational arc as the arm 28 is rotated clockwise. The slots 40 allow appropriate adjustment of the stop.

A cable 44 is attached to the forward portion of the deflector arm 28 ahead of the pivot rod axis and passes around a first sheave 46 on the midportion of the delivery tube, then around a second sheave 48 on the forward portion of the crop-receiving body 14, then around a third sheave 50 on the side portion of the body and then around a pivotally-mounted member or arm 52 and is terminally anchored to the upper end of a spring-loaded bolt 54 which extends through an opening in the forward portion of the arm 52 and carries a helical spring 56 under compression below the arm 52. The arm 52 is pivotally mounted on a transverse pivot shaft 58 and its rearward portion contacts and slidably rides on the one member 60 of a bell crank 62. As the bell crank 62 is rocked by an hydraulic cylinder 64 and the compressor roof 16 vertically reciprocates, the arm 52 is rocked. As the compressor roof 16 is lowered through its initial phase, the bell crank 62 is rocked clockwise, as is the arm 52, and the tension in the cable 44 is relaxed so that the deflector spring 30 under tension contracts and the deflector 24 is rotated clockwise to a deflect position. Crop material propelled through the delivery 22 is accordingly deflected downwardly and toward the front portion of the body 14. After the compressor roof 16 has lowered approximately eight inches, the deflector 24 is stopped by the stop means 36. When the compressor roof 16 is in the fully raised position, the deflector is up and enables the stream of crop material to be propelled to the rearward portion of the body. Due to the velocity inherently possessed by the crop material propelled through the delivery spout, little or no deflection is needed to assure that the rear portions of the receiving body are filled.

We claim:

1. In a crop harvesting machine having a mobile frame, a crop-receiving body on the frame, a crop pickup and delivery means carried on the frame independent of the body for picking crop material up and delivering same to the body, said body having a crop compressor roof movable between raised and lowered positions to compress crop material contained in the body, and lift means for effecting vertical movement of the compressor roof, the improvement comprising: a deflector movably carried by the crop delivery means; interconnecting means between the compressor roof lift means and deflector for causing the deflector to respond to the vertical movement of the compressor roof and control the inclination of the crop stream issuing from the delivery means; and biasing means acting with said interconnecting means to move the deflector towards the limits of its movement.

2. The invention as defined in claim 1 wherein the means interconnecting the deflector and compressor roof lift means is a direct mechanical linkage mechanism.

3. The invention defined in claim 1 in which the deflector is rotatably mounted on a horizontally transverse pivot and located within and at the upper end of said delivery means.

4. The invention as defined in claim 1 wherein the delivery means is a crop-propelling tube located on the frame forward of the crop-receiving body, the lower portion thereof having a spout generally vertical, and the upper portion having an arcuate shape terminating in a rearwardly directed discharge opening.

5. A crop harvesting machine having a mobile frame, a crop-receiving body on the frame, a crop pickup and delivery means carried on the frame independent of the body for picking crop material up and delivering same to the body, said body having a crop compressor roof movable between raised and lowered positions to compress crop material contained in the body, and lift means for effecting vertical movement of the compressor roof, the improvement comprising: a deflector movably carried by the crop delivery means, and means interconnecting the compressor roof lift means and deflector for causing the deflector to respond to the vertical movement of the compressor roof and control the inclination of the crop stream issuing from the delivery means, said interconnecting means including: a horizontally transverse deflector pivot shaft mounted on the delivery tube means, the deflector secured thereto; a vertical deflector arm secured to the horizontally transverse deflector pivot shaft and rotatable in direct relation to the deflector pivot shaft; a deflector arm stop means secured to the deflector arm, detachably secured and slidably adjustable to vary the maximum rotational capability of the deflector; an arm spring means, one portion removably attached to the rearward portion of the deflector arm, the other portion removably attached to the delivery means wall, exerting a clockwise biasing force on the deflector arm which force in turn is transferred to the deflector; a horizontally transverse body pivot shaft mounted on the side of the crop-receiving body; a pivotally-mounted member on the body pivot shaft with an opening in its forward portion and its rearwardmost portion slidably meeting the compressor roof lift means for pivotal movement in direct response to the compressor roof lift movement; a slidable bolt vertically extending through the pivotal member opening, having a helical spring surrounding the bolt, between the pivotal member and a nut secured to the bolt lower portion, to cause the bolt to remain below the pivotal member; a plurality of sheaves attached to the crop-receiving body and delivery means; a cable detachably connected to the deflector arm and passing through the sheaves and detachably connected to the spring-loaded bolt upper portion; and with said interconnecting means effecting an integral connection between the deflector and compressor roof movement to cause the deflector to directly respond to the roof movement.

6. In a crop harvesting machine having a mobile frame, a crop-receiving body on the frame, a crop pickup and delivery means carried on the frame independent of the body for picking crop material up and delivering same to the body, said body having a crop compressor roof movable between raised and lowered positions to compress crop material contained in the body, and lift means for effecting vertical movement of the compressor roof, the improvement comprising: a deflector movably carried by the crop delivery means, and interconnecting means between the compressor roof lift means and deflector for causing the deflector to respond to the vertical movement of the compressor roof and control the inclination of the crop stream issuing from the delivery means, said interconnecting means including an arm on the deflector; stop means cooperating between the arm and the delivery means for limiting movement of said deflector; rockable means on the body and rockable by the lift means; linkage means interconnecting the rockable means and arm; and biasing means acting with said linkage to move the deflector towards the limits of its movement.

7. In a crop harvesting machine having a mobile frame, a crop-receiving body on the frame, a crop pickup and delivery means carried on the frame independent of the body for picking crop material up and delivering same to the body, said body having a crop compressor roof movable between raised and lowered positions to compress crop material contained in the body, and lift means for effecting vertical movement of the compressor roof, the improvement comprising: a deflector movably carried by the crop delivery means, and means interconnecting the compressor roof lift means and deflector for causing the deflector to respond to the vertical movement of the compressor roof and thereby control the inclination of the crop stream issuing from the delivery means, said interconnecting means including stop means cooperating between the deflector and the delivery means for limiting movement of said deflector; rockable means on the body and rockable by the lift means; linkage means interconnecting the rockable means and deflector; and biasing means acting with said linkage means for maintaining deflector response to roof movement irrespective of the relative positions of the body and delivery means.

8. In a crop harvesting machine having a mobile frame, a crop-receiving body on the frame, a crop pickup and delivery means for picking crop material up and delivering same to the body, means carrying the pickup and delivery means for vertical movement relative to the frame as variations in ground contour are encountered, said body having a crop compressor means movable between raised and lowered positions to compress crop material contained in the body, and force-transmitting means for effecting vertical movement of the compressor means, the improvement comprising: a deflector movably carried by the crop delivery means, and means interconnecting the force-transmitting means and the deflector for causing the deflector to respond to the vertical movement of the compressor means and to control the inclination of the crop stream issuing from the delivery tube, said interconnecting means including compensating means for preventing variations in the position of the deflector caused by vertical movement of the pickup means relative to the body.

9. In a crop harvesting machine having a mobile frame, a crop-receiving body on the frame, a crop pickup and delivery means carried on the frame independent of the body for picking crop material up and delivering same to the body, said body having a crop compressor roof movable between raised and lowered positions to compress crop material contained in the body, and lift means for effecting vertical movement of the compressor roof, the improvement comprising: a deflector movably carried by the crop delivery means, and means interconnecting the compressor roof lift means and deflector for causing the deflector to respond to the vertical movement of the compressor roof and thereby control the inclination of the crop stream issuing from the delivery means, said interconnecting means including a flexible member connected at its one end with the compressor lift means, trained over a first sheave secured to said body, trained over a second sheave, said second sheave carried on said pickup and delivery means generally horizontal with said first sheave and connected at its other end with said deflector.

10. The invention defined in claim 9 further characterized in that the interconnecting means includes spring means operatively acting between each end of the flexible member and its respective connection to prevent variations in the deflector position by compensating for vertical movement of the independent pickup and delivery means relative to the body.

11. The invention defined in claim 8 wherein the means interconnecting includes a flexible member connected at its one end with the force-transmitting means and at its other end with said deflector and said compensating means includes spring means operatively acting between each end of the flexible member and its respective connection to prevent variations in the deflector position caused by vertical movement of the pickup and delivery means relative to the frame as variations in the ground contour are encountered.

* * * * *

UNITED STATES PATENT OFFICE
CERTIFICATE OF CORRECTION

Patent No. 4,005,565     Dated  1 February 1977

Inventor(s) Terry Lee Lowe and Glenn Dale Head

It is certified that error appears in the above-identified patent and that said Letters Patent are hereby corrected as shown below:

Column 3, line 55, delete "tube".

Signed and Sealed this

Fifteenth Day of November 1977

[SEAL]

Attest:

RUTH C. MASON
*Attesting Officer*

LUTRELLE F. PARKER
*Acting Commissioner of Patents and Trademarks*